United States Patent [19]

Nitoh et al.

[11] Patent Number: 4,933,386

[45] Date of Patent: Jun. 12, 1990

[54] POLYARYLENE SULFIDE RESIN COMPOSITION

[75] Inventors: Toshikatsu Nitoh; Yoshihito Tsukamoto, both of Fuji, Japan

[73] Assignee: Polyplastics Co., Ltd., Osaka, Japan

[21] Appl. No.: 312,662

[22] Filed: Feb. 17, 1989

[30] Foreign Application Priority Data

Mar. 4, 1988 [JP] Japan .................................. 63-50746

[51] Int. Cl.$^5$ .......................... C08K 5/52; C08K 3/38; C08K 3/28; C08K 3/34

[52] U.S. Cl. .................................... 524/127; 524/404; 524/413; 524/423; 524/424; 524/425; 524/430; 524/431; 524/442; 524/443; 524/444; 524/447; 524/448; 524/451; 524/452; 524/493

[58] Field of Search ............... 524/127, 404, 413, 423, 524/424, 425, 430, 431, 442, 443, 444, 447, 448, 451, 452, 493

[56] References Cited

U.S. PATENT DOCUMENTS 4,728,685 3/1988 Bier et al. ............................ 524/303

FOREIGN PATENT DOCUMENTS 0045351 3/1984 Japan .................................. 524/127

62-230850 10/1987 Japan .

*Primary Examiner*—Kriellion Morgan

*Attorney, Agent, or Firm*—Depaoli & O'Brien

[57] ABSTRACT

A polyarylene sulfide resin composition, being improved in thermal resistance and mouldability, comprises (A) 100 parts by weight of a polyarylene sulfide resin, (B) 0.5 to 30 parts by weight of a phosphoric ester represented by the following formula (1):

(1)

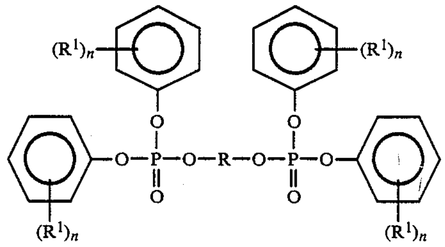

19 Claims, No Drawings

POLYARYLENE SULFIDE RESIN COMPOSITION

BACKGROUND OF THE INVENTION

The present invention relates to a polyarylene sulfide resin composition. More particularly, the present invention relates to a polyarylene sulfide resin composition having an improved crystallization speed and excellent heat resistance and moldability.

Frame-retardant thermoplastic resins having high heat resistance and high chemical resistance are required as materials of construction for components in electric and electronic applicances, automobile appliances and chemical instruments. A polyarylene sulfide resin (PAS) represented by polyphenylene sulfide (PPS) is one of the resins satisfying this requirement and the demand for such a resin is increasing because it can afford superior physical properties with a relatively reduced cost.

However, when PAS is processed by injection molding, the resin takes on a peculiar crystallization behavior and many undesirable phenomena are observed in the molding operation.

Further, since the crystallization speed of PAS is low, a molded article of high crystallinity cannot be obtained unless molding is carried out at a high mold temperature.

The following techniques of accelerating the crystallization of PAS have been recently proposed.

(1) An oligomeric ester is added (see Japanese Patent-Laid-Open No. 45654/1987).

(2) Another thioether is added (see Japanese Patent Laid-Open No. 230849/1987).

(3) A carboxylic acid ester is added (see Japanese Patent Laid-Open No. 230848/1987).

(4) A certain phosphoric ester is added (see Japanese Patent Laid-Open No. 230850/1987).

Unfortunately, these methods have been found to yield the following problems. Namely the heat resistance of the additive is poor and an evaporation gas or decomposition gas is generated during molding.

Furthermore, if the molded piece is annealed, the additive is diffused to cause weight reduction.

Accordingly, an object of the present invention is to develope a polyarylene sulfide resin composition, especially a polyphenylene sulfide resin composition, having an increased crystallization speed sufficient to forgo the necessity of using a high mold temperature in injection molding.

Another object of this invention is to provide a polyarylene sulfide composition having a high crystallinity even if molding is carried out at a low mold temperature.

Still another object of the invention is to provide a polarylene sulfide composition which does not generate either an evaporation or decomposition gas during extrusion or molding.

SUMMARY OF THE INVENTION

It has now been found that a PAS composition having incorporated therein as represented by the following formula (1), a phosphoric ester having bulky substituents and two ester groups, has good heat stability, scarely generates any decomposition or evaporation gas at the temperatures used for extruding or molding a polyhenylene sulfide resin, has a lowered glass transition point and an increased crystallization speed, and exhibits a high crystallinity at a much lower mold temperature than that adopted in the prior art.

More specifically, in accordance with the present invention, there is provided a polyarylene sulfide resin composition comprising (A) 100 parts by weight of a polyarylene sulfide resin, (B) 0.5 to 30 parts by weight of a phosphoric ester represented by the following formula (1):

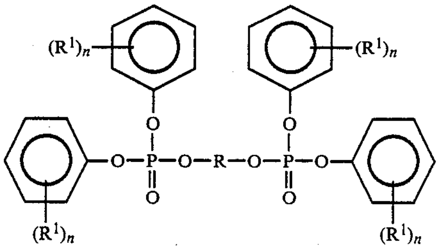
(1)

wherein R stands for a divalent organic group, $R^1$ stands for a group selected from among aliphatic groups having 1 to 20 carbon atoms, alicyclic groups having 3 to 13 carbon atoms and aromatic groups having 6 to 18 carbon atoms, with the proviso that groups $R^1$ may be the same or different and n is an integer of 0 to 3, and (C) up to 400 parts by weight of an inorganic filler.

Furthermore, it has been found that if a nucleating agent for actively forming crystal nuclei is further incorporated in addition to the above-mentioned phosphoric ester, the effect of increasing the crystallinity at a low mold temperature is synergistically enhanced.

More specifically, a polyarylene sulfide resin composition further comprising (D) 0.002 to 5 parts by weight of a nucleating agent in addition to the above-mentioned components (A), (B) and (C) has an enhanced crystallization promoting effect and the mold temperature in the molding can be extremely lowered.

DETAILED DESCRIPTION OF THE INVENTION

The polyarylene sulfine resin (A) is used as the base resin in the present invention, and this resin is a polymer comprising at least 70 mole % of recurring units represented by the formula $-Ar-S\!\!+$ in which Ar stands for an aryl group (hereinafter referred to as "PAS"). A typical instance of this resin is polyphenylene sulfide comprising at least 70 mole % of recurring units represented by the structural formula $+Ph-S+$ in which Ph stans for a phenyl group (hereinafter referred to as "PPS"). A PPS polymer having a melt viscosity of 10 to 20000 P, particularly 100 to 5000 P, as measured at a temperature of 310° C. and a shear rate of 1200 $sec^{-1}$, is especially preferred.

As is known, PPS is generally classified into a substantially linear type having neigher branched nor crosslinked structure and a type having a branched or crosslinked structure according to the preparation process. Each of these two types can be effectively used.

A PPS polymer comprising at least 70 mole %, especially at least 80 mole %, of p-phenylene sulfide units

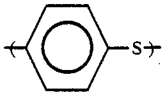

as recurring units is preferably used as the PPS polymer in the present invention. When the content of the above-mentioned recurring units is lower than 70 mole %, the crystallinity, one of the characteristics of a crystalline polymer, is reduced and a sufficient strength is hardly obtained, and the toughness tends to be degraded.

The linear PPS polymer used in the present invention may comprise up to 30 mole % of other comonomer units. For example, there can be mentioned m-phenylene sulfide units

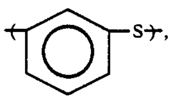

diphenyl ketone sulfide units

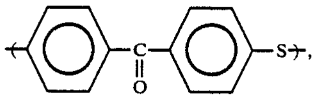

diphenyl sulfone units

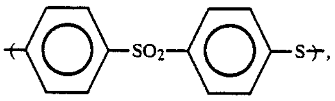

diphenyl sulfide units

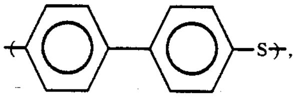

diphenyl ether sulfide units

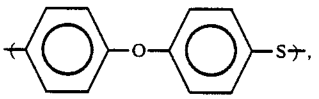

2,6-naphthalene sulfide units

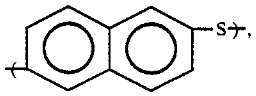

and trifunctional units

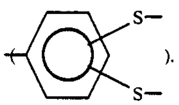

In order to prevent reduction in the crystallinity, it is preferred that the content of the trifunctional units be up to 1 mole %.

A linear PPS homopolymer comprising a p-phenylene sulfide units

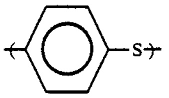

as the recurring units and a linear PPS block copolymer comprising 70 to 95 mole % of p-phenylene sulfide recurring units

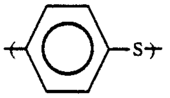

and 5 to 30 mole % of m-phenylene sulfide recurring units

are preferably used as the PPS polymer in the present invention.

Any of phosphoric esters having a structure represented by the formula (1) is effectively added as the component (B) in the present invention. Any of divalent aliphatic groups having 1 to 20 carbon atoms, divalent alicyclic groups having 3 to 13 carbon atoms and divalent aromatic groups having 6 to 18 carbon atoms can be used as R in the formula (1). In view of the heat resistance, a divalent aromatic group is preferred. For example,

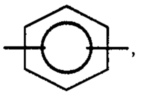

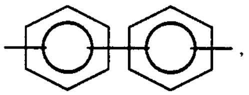

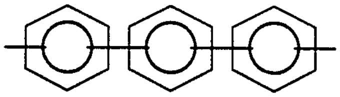

and

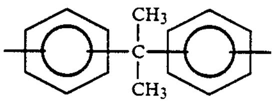

are especially effective. In view of the cost of the starting material,

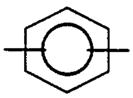

and

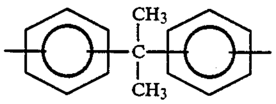

are preferred as R.

Any of aliphatic groups having 1 to 20 carbon atoms, alicyclic groups having 3 to 13 carbon atoms and aromatic groups having 6 to 18 carbon atoms is effective as $R^1$, and groups $R^1$ may be the same or different. A phosphoric ester having no substituent, that is, a phosphoric ester in which n in the formula (1) is zero, has a crystallization promoting effect and a sufficient heat resistance. $R^1$ having too high a molecular weight is not preferred because the effect of lowering the glass transition point of the composition is reduced and so is the effect of increasing the crystallization speed.

In view of the foregoing, methyl and isopropyl groups are preferred as $R^1$, and a methyl group is especially preferred because the effect of increasing the crystallization speed, the heat resistance, the bleeding resistance and the starting material cost are well balanced. Furthermore, a value of n of 0 to 2 is preferred and 0 or 1 is especially preferred because the bleeding resistance, the heat resistance and the effect of increasing the crystallization speed are well balanced.

In view of the foregoing, structures shown in the Note of Table 1 below, especially structures A and E, are particularly preferred as the phosphoric ester component (B) because the effect of increasing the crystallization speed, the heat resistance, the bleeding resistance, the synthesis easiness and the starting material cost are well balanced.

The crystallization promoting component (B) represented by the formula (1) is used in an amount of 0.5 to 30 parts by weight, preferably 1 to 15 parts by weight, per 100 parts by weigth of the polyarylene sulfide resin in the present invention.

When the amount of the component (B) is too small, the intended effect cannot be attained, while when the amount of the component (B) is too large, the physical properties are drastically degraded and no good results can be obtained.

Although the inorganic filler (C) used in the present invention is not an indispensable component, its use is preferable in order to obtain a molded article excellent in various properties such as mechanical strengths, heat resistance, dimension stability (resistance against deformation and warping) and electric properties. A fibrous filler, a powdery or granular filler and a platy filler can be used according to the intended object.

As the fibrous filler, there can be mentioned fibers of metals and inorganic substances, such as glass fiber, asbestos fiber, carbon fiber, silica fiber, silica/alumina fiber, zirconia fiber, boron nitride fiber, silicon nitride fiber, boron fiber, potassium titanate fiber, stainless steel fiber, aluminum fiber, titanium fiber, copper fiber and brass fiber. Glass and carbon fibers are typical instances of the fibrous filler. A high-melting organic fibrous substance such as polyamide, fluororesin or acrylic resin can also be used.

As the powdery or granular filler, there can be mentioned carbon black, silica, quartz powder, glass bead, glass powder, silicates such as calcium silicate, aluminum silicate, kaolin, talc, clay, diatomaceous earth and wollastonite, metal oxides such as iron oxide, titanium oxide, zinc oxide and alumina, metal carbonates such as calcium carbonate and magnesium carbonate, metal sulfates such as calcium sulfate and barium sulfate, silicon carbide, silicon nitride, boron nitride and metal powders.

As the platy filler, there can be mentioned mica flake, glass flake and various metal foils.

These inorganic fillers can be used singly or in the form of two or more of them. A combined use of a fibrous filler, especially glass fiber or carbon fiber, and a granular and/or platy filler is especially preferred because a good combination of the mechanical strengths, dimensional precision and electric properties can be attained.

When a filler as mentioned above is used, a coupling agent or a surface treatment is preferably used according to need. For example, a functional compound such as an epoxy compound, an isocyanate compound, a silane compound or a titanate compound is used. The filler can be subjected to surface treatment or coupling treatment with a compound as mentined above in advance, or the compound is added when the composition is prepared.

The inorganic filler is used in an amount up to 400 parts by weight, preferably 10 to 300 parts by weight, per 100 parts by weight of the polyarylene sulfide resin as the component (A) When the amount of the inorganic filler is smaller than 10 parts by weight, the mechanical strengths are relatively poor, while when the amount of the inorganic filler is too large, the molding operation becomes difficult and the mechanical strength of the molded article is insufficient.

When a nucleating agent is further incorporated into the composition of the present invention, the crystallization speed is further increased and the effect of the present invention is further enhanced.

Either an organic nucleating agent or an inorganic nucleating agent can be used for this purpose.

As the inorganic nucleating agent, there can be used Zn powder, Al powder, graphite, carbon black, metal oxides such as ZnO, MgO, $Al_2O_3$, $TiO_2$, $MnO_2$, $SiO_2$ and $Fe_3O_4$, nitrides such as boron nitride, inorganic salts such as $Na_2CO_3$, $CaCO_3$, $MgCO_3$, $CaSO_4$, $CaSIO_3$, $BaSO_4$ and $Ca_3(PO_4)_3$, and clays such as talc, kaolin, clay and china clay.

As the organic nucleating agent, there can be used organic acid salts such as calcium oxalate, sodium oxalate, calcium benzoate, calcium phthalate, calcium tartrate and magnesium stearate, heat-resistant polymers and crosslinked heat-resistant polymers.

Boron nitride, clays such as talc, kaolin, clay and china clay and polymeric compounds having a crosslinked or branched structure are especially preferred.

As the polymeric compound having a crosslinked or branched structure, there can be mentioned a polymeric compound having a branched or crosslinked structure, which is formed by polycondensing a monomer having a trifunctional or higher functional group as a part of the comonomer, and a polymeric compound formed by imparting a crosslinked or branched structure to an existent polymeric substance.

Some of the above-mentioned nucleating agents serve also as the inorganic fillers. Such substances exert both the functions. It will suffice when the amount of the nucleating agent is 0.002 to 5 parts by weight, preferably 0.02 to 2 parts by weight, per 100 parts by weight of the polyarylene sulfide resin. When the amount of the nucleating agent is smaller than 0.002 part by weight, the effect of increasing the crystallization speed is not sufficient.

A small amount of other thermoplastic resin may be incorporated in the base resin of the present invention, so far as attainment of the intended object is not hindered. Any of thermoplastic resins stable at high temperatures can be used as said other thermoplastic resin. For example, there can be mentioned aromatic polyesters derived from an aromatic dicarboxylic acid and a diol or hydroxy carboxylic acid, such as polyethylene terephthalate and polybutylene terephthalate, polyamides, polycarbonates, ABS resins, polyphenylene oxides, polyalkyl acrylates, polyacetals, polysulfones, polyether sulfones, polyether imides, polyether ketones and fluororesins. A mixture of two or more of these thermoplastic resins can also be used.

Known substances to be added to thermoplastic or thermosetting resins, for example, stabilizers such as antioxidants and ultraviolet absorbers, antistatic agents, flame retardants, colorants such as dyes and pigments, and lubricants, can be appropriately added to the composition of the present invention according to the required properties.

The polyarylene sulfide resin composition of the present invention can be prepared by using equipment and procedures customarily adopted for the preparation of synthetic resin compositions. Namely, necessary components are mixed and the mixture is kneaded and extruded by using a single-screw or twin-screw extruder to form a molding pellet. Furthermore, there can be adopted a method in which a master batch of some of the necessary components is mixed with other components and the mixture is molded, and a method in which a part or the whole of the polyarylene sulfide resin is pulverized for improving the dispersin state of each component and the mixture is melt extruded.

EXAMPLES

The present invention will now be described in detail by referring to the following Examples that by no means limit the scope of the invention.

EXAMPLES 1 THROUGH 14 AND COMPARATIVE EXAMPLES 1 THROUGH 3

Compounds shown in Table 1 were added in amounts shown in Table 1 to a polyphenylene sulfide resin ("Fortolon KPS" supplied Kureha Kagaku Kogyo), and they were preliminarily mixed with a Henschel mixer.

Then, commerically available glass fibers (having a diameter of 13μm and a length of 3 mm) were added in an amount shown in Table 1 to the mixture, and the formed composition was mixed for 2 minutes with a blender and extruded through an extruder having a cylinder temperature of 310° C. to form pellets of a polyphenylene sulfide resin composition.

A platy test piece having a thickness of 3 mm and a size of 50 mm×70 mm was molded from the obtained pellet at a cylinder temperature of 320° C. and a mold temperature shown in Table 1 by using an injection molding machine. The crystallinity was measured by using a rad-rd X-ray diffraction apparatus supplied by Rigaku Denki.

The molded test piece was allowed to stand still for 24 hours in an atmosphere at room temperature (23° C.) and a relative humidity of 50% and the size of the test piece was measured. Then, the test piece was annealed at 150° C. for 3 hours and the size was measured to calculate the post shrinkage.

Furthermore, the molded piece was allowed to stand still for 24 hours in an atmosphere maintained at room temperature (23° C.) and a relative humidity of 50% and the weight was measured. Then, the test piece was heat treated at 200° C. for 3 hours and the weight was measured in an atmosphere maintained at a temperature of 23° C. and a relative humidity of 50% to calculate the thermal weight loss. Furthermore, the surface gloss and mold release property were evaluated.

The obtained results are shown in Table 1.

TABLE 1

| | Composition | | | | | | Mold temperature of 90° C. | | | | | Mold temperature of 130° C. | | | | |
|---|---|---|---|---|---|---|---|---|---|---|---|---|---|---|---|---|
| | resin | glass fiber | phosphoric ester | | nucleating agent | | crystallinity | post shrinkage | thermal weight | surface | mold release | crystallinity | post shrinkage | thermal weight | surface | mold release |
| | (pts. by wt.) | (pts. by wt.) | kind | (pts. by wt.) | kind | (pts. by wt.) | (%) | (%) | loss (%) | gloss | property | (%) | (%) | loss (%) | gloss | property |
| | 100 | 65 | A | 1 | — | 0 | 18 | 0.10 | 0.03 | fair | excellent | 35 | 0.03 | 0.04 | good | excellent |
| | 100 | 65 | A | 5 | — | 0 | 25 | 0.09 | 0.04 | good | excellent | 34 | 0.05 | 0.04 | excellent | excellent |
| | 100 | 65 | A | 10 | — | 0 | 30 | 0.05 | 0.06 | good | excellent | 35 | 0.05 | 0.05 | excellent | excellent |
| | 100 | 65 | A | 30 | — | 0 | 36 | 0.05 | 0.25 | good | excellent | 36 | 0.06 | 0.27 | good | excellent |
| | 100 | 0 | A | 10 | — | 0 | 32 | 0.16 | 0.11 | good | excellent | 35 | 0.14 | 0.13 | good | excellent |
| | 100 | 200 | A | 10 | — | 0 | 36 | 0.03 | 0.04 | fair | good | 36 | 0.03 | 0.05 | fair | good |
| | 100 | 65 | B | 10 | — | 0 | 32 | 0.04 | 0.04 | good | good | 34 | 0.03 | 0.04 | good | excellent |
| | 100 | 65 | C | 10 | — | 0 | 30 | 0.05 | 0.03 | good | excellent | 35 | 0.04 | 0.04 | good | excellent |
| | 100 | 65 | D | 10 | — | 0 | 28 | 0.04 | 0.06 | good | excellent | 34 | 0.04 | 0.04 | good | excellent |
| | 100 | 65 | E | 10 | — | 0 | 33 | 0.04 | 0.05 | good | excellent | 35 | 0.03 | 0.05 | good | excellent |
| | 100 | 65 | A | 10 | G | 0.1 | 39 | 0.04 | 0.06 | good | excellent | 40 | 0.03 | 0.05 | excellent | excellent |
| | 100 | 65 | A | 10 | G | 1.0 | 40 | 0.03 | 0.04 | excellent | excellent | 38 | 0.03 | 0.04 | excellent | excellent |
| | 100 | 65 | A | 10 | H | 0.1 | 39 | 0.02 | 0.04 | excellent | excellent | 38 | 0.03 | 0.04 | excellent | excellent |
| | 100 | 65 | B | 10 | I | 1.0 | 36 | 0.03 | 0.05 | excellent | excellent | 36 | 0.04 | 0.04 | excellent | excellent |
| Ex.1 | 100 | 65 | — | 0 | — | 0 | 2 | 0.15 | 0.02 | bad | bad | 33 | 0.04 | 0.01 | good | good |
| Ex.2 | 100 | 0 | — | 0 | — | 0 | 1 | 0.43 | 0.01 | bad | bad | 34 | 0.15 | 0.00 | good | good |
| Ex.3 | 100 | 65 | F | 10 | — | 0 | 33 | 0.04 | 1.20 | excellent | excellent | 36 | 0.05 | 1.19 | excellent | excellent |

Note

A: 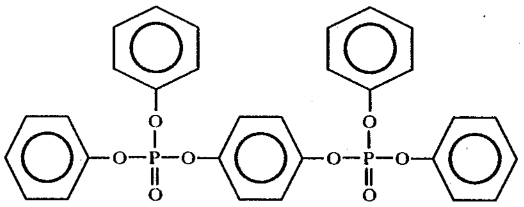

B: 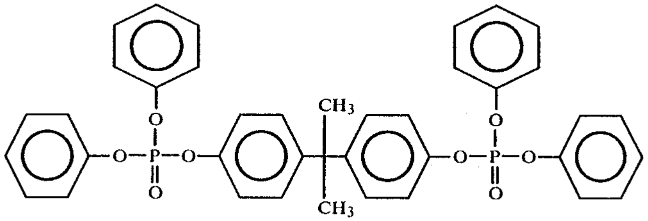

TABLE 1-continued

| Composition | | | | | | Mold temperature of 90° C. | | | | | Mold temperature of 130° C. | | | | |
|---|---|---|---|---|---|---|---|---|---|---|---|---|---|---|---|
| resin (pts. by wt.) | glass fiber (pts. by wt.) | phosphoric ester | | nucleating agent | | crystallinity (%) | post shrinkage (%) | thermal weight loss (%) | surface gloss | mold release property | crystallinity (%) | post shrinkage (%) | thermal weight loss (%) | surface gloss | mold release property |
| | | kind | (pts. by wt.) | kind | (pts. by wt.) | | | | | | | | | | |

C: 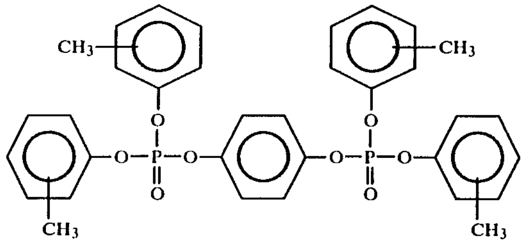

D: 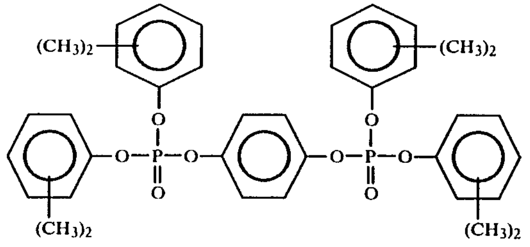

E: 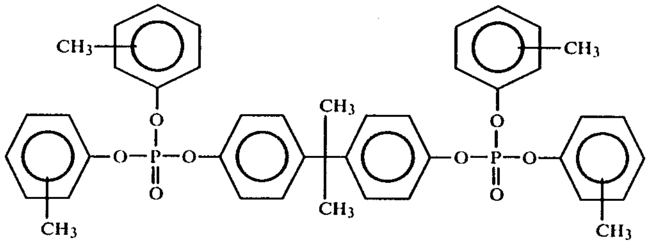

F: 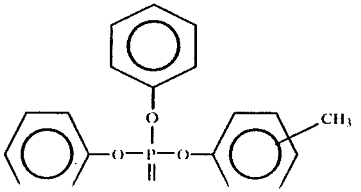

EFFECT OF THE INVENTION

As is apparent from the foregoing description and examples, the polyarylene sulfide resin composition according to the present invention is highly improved in the crystallization promoting effect in molding over the conventinal polyarylene sulfide resin compositions, and the following advantages can be attained.

(1) A molded article having a high crystallinity can be obtained even when molding is carried out at a mold temperature lower by 10 to 60° C. than the ordinary mold temperature.

(2) The molded article has excellent dimension stability, good surface gloss, and excellent mold release property.

(3) Since the molding cycle can be shortened and the productivity can be improved, the cost of the molded article can be reduced.

(4) Since the mold temperature can be lowered, molding can be easily performed and the safety is increased.

(5) Since the heat stability is excellent and an evaporation or decomposition gas is scarcely generated from additives in the molding or annealing step, occurrence of a trouble due to this gas can be substantially prevented.

We claim:

1. A polyarylene sulfide resin composition comprising (A) 100 parts by weight of a polyarylene sulfide resin, (B) 0.5 to 30 parts by weight of a phosphoric ester represented by the following formula (1):

(1)

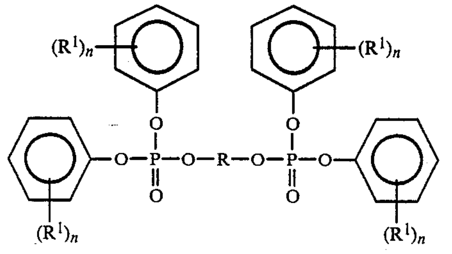

wherein R stands for a divalent organic group selected from aliphatic groups having 1 to 20 carbon atoms, alicyclic groups having 3 to 13 carbon atoms and aromatic groups having 6 to 18 carbon atoms, $R^1$ stands for a group selected from among aliphatic groups having 1 to 20 carbon atoms, alicyclic groups having 3 to 13 carbon atoms and aromatic groups having 6 to 18 carbon atoms, with the proviso that groups $R^1$ may be the same or different, and n is an integer of 0 to 3.

2. A polyarylene sulfide resin composition as set forth in claim 1, which further comprises 0.002 to 5 parts by weight of a nucleating agent.

3. A polyarylene sulfide resin composition as set forth in claim 2, wherein the nucleating agent is at least one member selected from the group consisting of boron nitride, kaolin, talc, clay and polymeric compounds having a crosslinked or branched structure.

4. A polyarylene sulfide resin composition as set forth in claim 1, which further comprises up to 400 parts by weight of an inorganic filler.

5. A polyarylene sulfide resin composition as set forth in claim 1 wherein R is a divalent aromatic group selected from the group consisting of

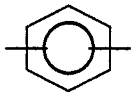

and

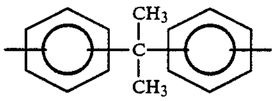

6. A polyarylene sulfide resin composition as set forth in claim 5 wherein $R^1$ is a methyl group and n is 1 or 2.

7. A polyarylene sulfide resin composition as set forth in claim 5 wherein n is 0.

8. A polyarylene sulfide resin composition as set forth in claim 1 wherein the polyarylene sulfide is polyphenylene sulfide.

9. A polyarylene sulfide resin composition as set forth in claim 8 wherein said polyphenylene sulfide comprises a copolymer comprising p-phenylene sulfide recurring units and m-phenylene sulfide recurring units.

10. A polyarylene sulfide resin composition as set forth in claim 9 wherein said copolymer comprises 70 to 95 mole % of p-phenylene sulfide recurring units and 5 to 30 mole % of m-phenylene sulfide recurring units.

11. A polyarylene sulfide resin composition as set forth in claim 5 wherein the polyarylene sulfide is polyphenylene sulfide.

12. A polyarylene sulfide resin composition as set forth in claim 11 wherein said polyphenylene sulfide comprises a copolymer comprising p-phenylene sulfide recurring units and m-phenylene sulfide recurring units.

13. A polyarylene sulfide resin composition as set forth in claim 12 wherein said copolymer compirises 70 to 95 mole % of p-phenylene sulfide recurring units and 5 to 30 mole % of m-phenylene sulfide recurring units.

14. The polyarylene sulfide resin composition as set forth in claim 4 wherein said inorganic filler comprises glass fibers.

15. A polyarylene sulfide resin composition comprising (A) 100 parts by weight of a polyarylene sulfide resin, (B) 0.5 to 30 parts by weight of a phosphoric ester represented by the following formula:

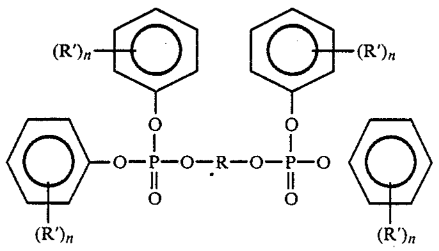

wherein R is a divalent aromatic group selected from the group consisting of

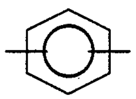

and

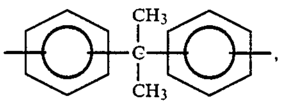

,

R' is a methyl group, and n is an interger of 0 to 3 and, (C) up to 400 parts by weight of an inorganic filler.

16. A polyarylene sulfide resin composition of chaim 15 wherein said inorganic filler is glass fibers.

17. A polyarylene sulfide resin composition of claim 16 wherein n is 0.

18. A polyarylene sulfide resin composition of claim 16 wherein n is 1.

19. A polyarylene sulfide resin composition of claim 16 wherein n is 2.

* * * * *